Patented Aug. 18, 1936

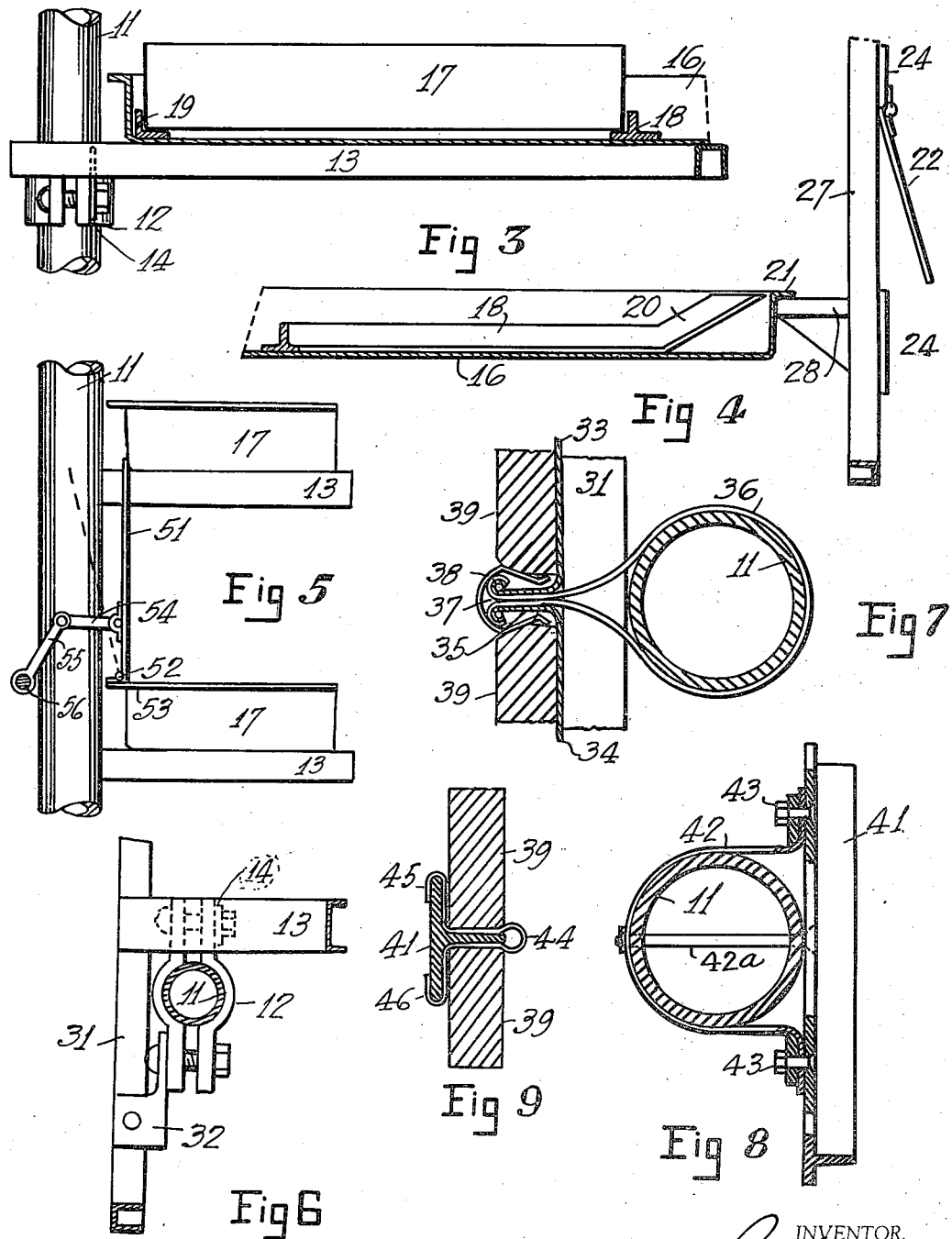

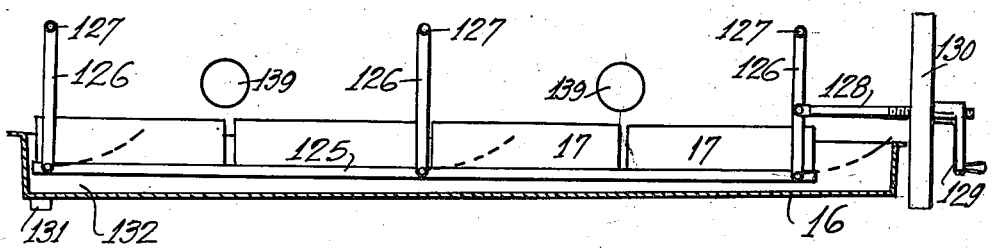
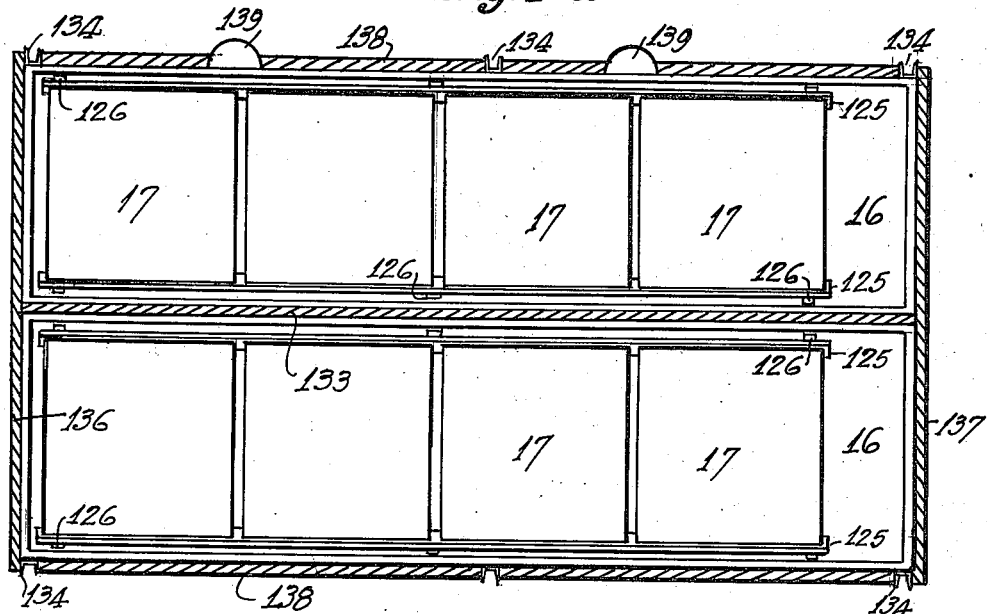

2,051,094

UNITED STATES PATENT OFFICE 2,051,094

SEED GERMINATING MACHINE

Matthew H. Loughridge, Bogota, N. J., assignor, by mesne assignments, to Plant Cultivation Company, New York, N. Y., a corporation of New York Application January 8, 1935, Serial No. 853

15 Claims. (Cl. 47—16)

This invention relates to seed cultivating machines, that is, machines that sprout or cultivate seeds in a short interval of time suitable for animal and for human food. The machine includes means for supplying a liquid fertilizer to the seed, means for maintaining the fertilizer within definite temperature limits and means for excluding the sunlight and air drafts. This machine may be used with the processes described in U. S. Patents 1,950,068 of March 6, 1934, and 1,950,701 of March 13, 1934.

An object of the present invention is to provide a seed germinating machine of fairly large capacity which is comparatively inexpensive to build; can be constructed from sheet stock without special fixtures; can be constructed in multiple units and is readily collapsible for packing and shipping. The invention includes a heating system comprising water coils for the fertilizing fluid or liquid plant food, and the machine is constructed with heat insulating walls so that low temperatures can be avoided in the winter time and excessive temperatures can be avoided in the summertime.

The machine will operate from the seed to the food stage in a certain number of days and in order to secure a daily supply it is divided into sections or compartments corresponding to the number of days necessary for the complete operation so that a section may be harvested and loaded each day.

The invention will be more particularly understood from the following specification and the accompanying drawings, in which;

Fig. 3 is a detail of the support of the trough and the seed tray with the trough sectioned;

Fig. 4 is a longitudinal section of the trough at the front end of the machine;

Fig. 5 shows in elevation an adjustable ventilator for the space above the troughs;

Fig. 6 is a detail showing a support of the transverse and longitudinal members by the pipe clamp, the pipe being shown in section;

Fig. 7 shows one method of securing the wall panels in place by a band of bendable material passing around the supporting post;

Fig. 8 shows, partly in section, a T-iron for supporting the wall panels and clamped to the post;

Fig. 9 is a detail in section showing a method of securing the wall panels to the T-iron;

Fig. 10a is a side elevation of the trough and trays, with the trough sectioned, showing a means of elevating the trays in the trough;

Fig. 10b is a plan view corresponding to Fig. 10a, with the enclosing walls sectioned.

The present invention comprises a machine having a tank or reservoir which is supplied with water and in which the fertilizing agent is dissolved and one or more troughs which are comparatively shallow and in which trays with the seed are placed. These trays have a perforated bottom so that the seed is saturated by the liquid in the trough which is supplied from the tank. In practice it is found that the liquid should be regulated and its temperature should be regulated for the best results in germination. For instance, for the first day or two the seed may be saturated, then it should be saturated only part of the time and for the remainder of the time it should be removed from the liquid. After the seed starts germinating it generates considerable heat of itself which, if properly directed, may be used to facilitate the process, but a certain amount of artificial heat is necessary in the liquid fertilizer which has been found to range from 70 to 85° F.

In order to conserve the heat of germination and to prevent sunlight getting access to the seed, the machine is entirely enclosed by walls which are preferably made from a heat insulating material and in order to prevent air currents developing in the machine each trough may be shut off from access to the others and peep holes are provided in the doors for inspection purposes.

Figure 1:
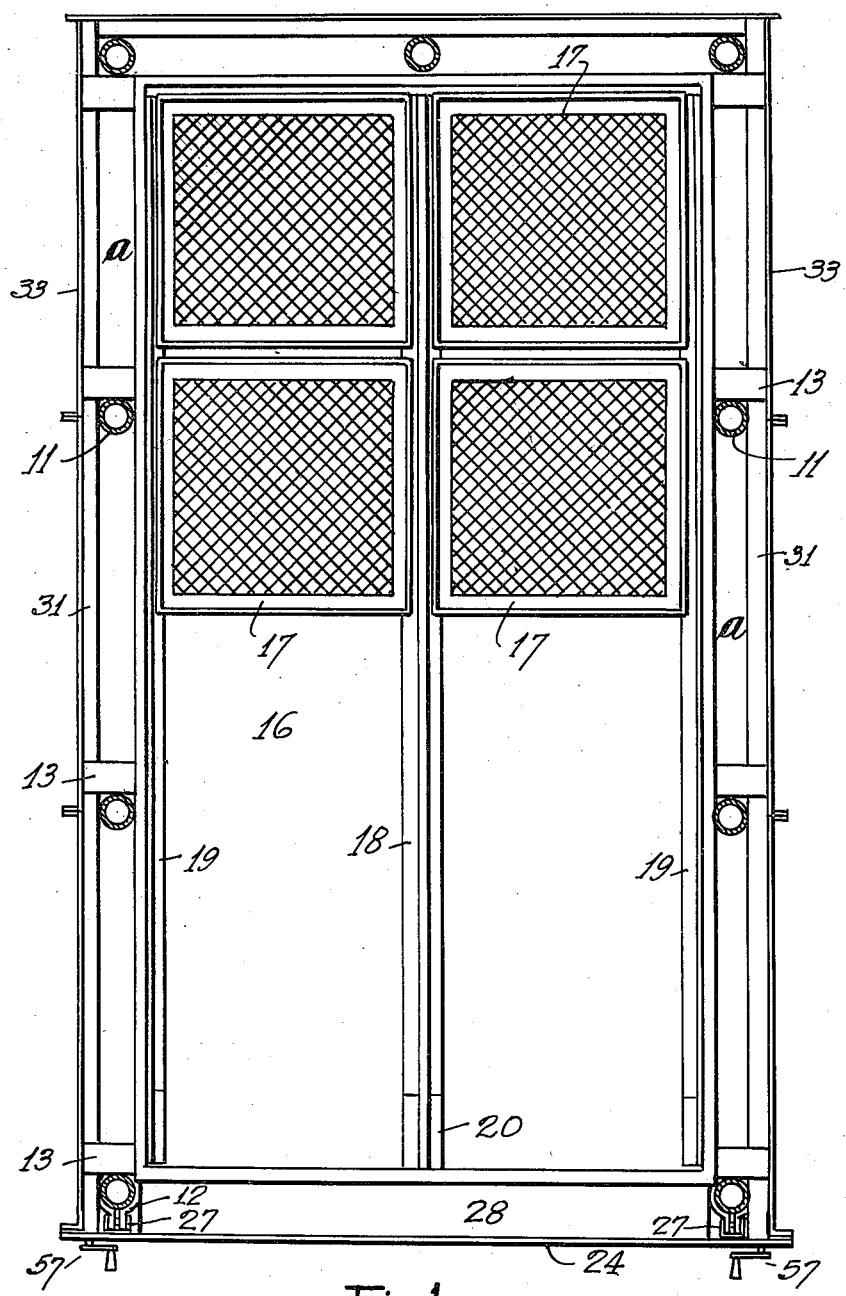
Fig. 1 is a plan view of a rectangular form of the machine with the top tank removed and with supporting posts shown in cross section.
Figure 2:
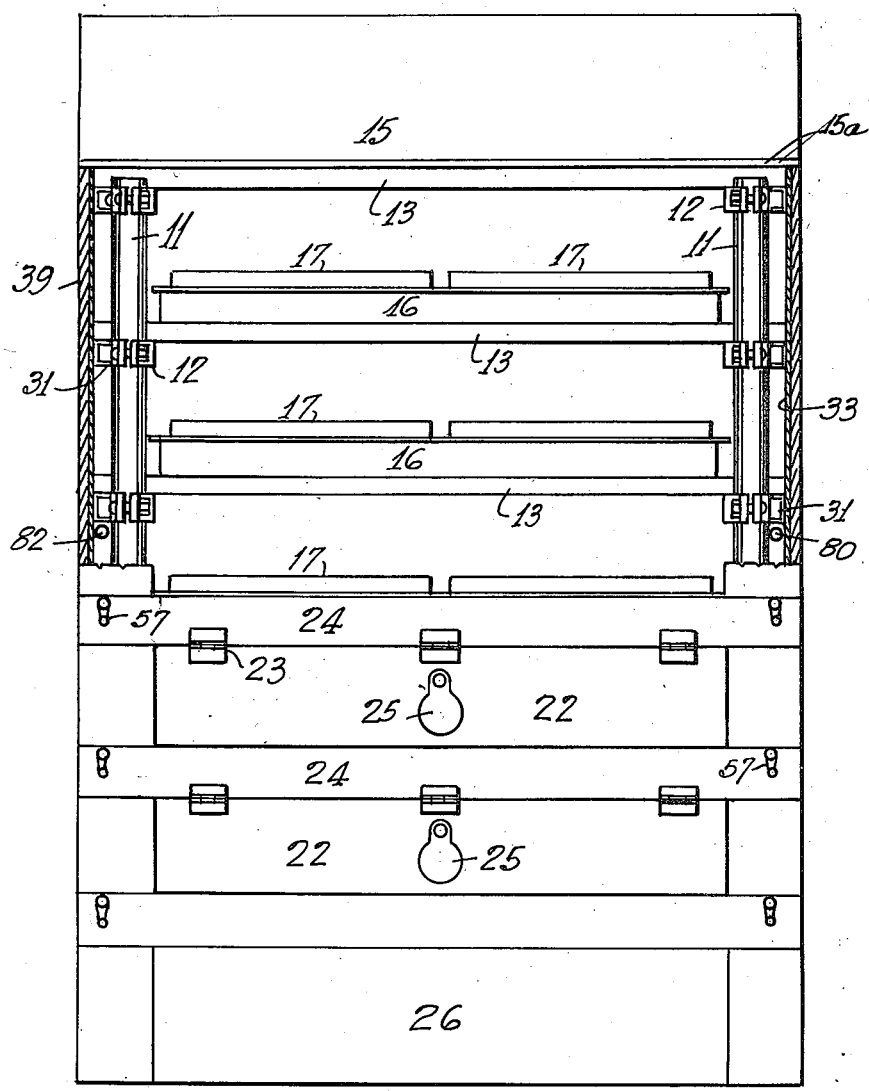
Fig. 2 is a front elevation, partly sectioned, of the machine shown in Fig. 1.

In practice it is possible to germinate ten pounds of maize into approximately forty pounds of cattle fodder in ten days, and, in order that the produce may be conveniently handled the trays are made of a limited size and are placed in a double row in the trough. The machine illustrated in Figs. 1 and 2 is provided with five troughs or sections so that for a ten day cycle of operation two of these units are required in which one trough is emptied and loaded each day.

In the drawings a row of pipe supporting columns, 11, are provided around the machine and are provided with clamps 12 for each section.

Extending transversely of the machine and supported by these clamps are the channels 13, held in place by the projecting plate 14, Fig. 3, secured by the clamping bolt. The top row of transverse members or channels 13 support the tank 15, which may be insulated from the apparatus below by the heat insulating board 15a. Upon each horizontal row of members 13 the troughs 16 rest in such a manner that any one of these troughs may be removed and replaced when the front of the machine is taken off without disturbing the others. Within each trough the double row of seed trays 17 are placed and are arranged to slide on the angle 19 and the T-bar 18 in the centre of the trough so that the bottom of the seed trays are raised above the bottom of the trough leaving room for the roots to grow downwardly in the liquid and, at the same time the weight of the trays is carried by the members 18 and 19 so that the trough only has to support the weight of the liquid which it contains and can therefore be made of comparatively light gage metal. Another advantage of the slides for the trays is that the slides will not wear out to any extent and thus the life of the trough is increased.

In order to facilitate the removal of the full trays over the edge of the trough the slide members 18 and 19 may be deflected upwardly as indicated at 20, Fig. 4, so that the tray may be raised over the lip 21 of the trough and this part of the trough is thus protected against damage by the sliding tray.

The front of the machine is provided with a pair of vertical channels indicated at 27, Fig. 1, which are supported by the clamping members 12. To these channels the front bars 24 are secured and from these bars the doors 22 for each section are hinged. The doors are provided at 25 with a peep hole and cover by which the progress of the growth in any section may be inspected. The board 28, Fig. 4, is provided between each trough and the front bar 24 to isolate each section and prevent air currents passing between the sections when the door is opened. The door 22 and the front bars 24 may be made from heat insulating stock or a combination of sheet metal and heat insulating board.

The machine in Figs. 1 and 2 is provided with an enclosing wall outside of the supporting columns 11, this wall encloses the vertical air space a between the walls and the trough and extends from the bottom to the top of the machine. This enclosure is obtained by the longitudinal channels 31 which are secured by a lug 32, Fig. 6, secured to the clamp 12. Against each of these channels the vertical panels 33 of galvanized iron are placed and these panels have their abutting edges bent outwardly as indicated at 35, Fig. 7, in which the edge of the sheet metal panel 34 abuts at 35 against the corresponding edge of the panel 33. In order to secure these panels in place in a manner that is comparatively inexpensive and so that they may readily be removed and replaced, a strap 36, preferably of galvanized iron, is placed around the supporting member 11 with its free ends passing between the abutting edges of the panels 33 and 34 and these free ends are curled around the edges of the panels so as to securely hold these panels against the channel 31. The straps 36 are provided at intervals as may be necessary and the outer edges may be protected by the spring clamp 38 which is snapped into place over the ends of the strap 36. In Fig. 7 the heat insulating board 39 is used in combination with the sheet metal panel 33 to make the wall of the machine and this board may be held in place by the spring clamp 38.

The structure shown in Figs. 8 and 9 may be used where the walls are provided inside instead of outside of the supporting columns. This comprises the longitudinal T-irons 41, secured at 43 by the clamp 42 to the post 11. In this case the sheet metal is dispensed with and the heat insulating board 39 is provided in panels which are secured by the clip 44 to the T-iron 41, this clip having a loop at 44 to engage the boards 39 and having its free ends bent over at 45 and 46 to engage the horizontal member.

The ventilator controlling the connection between the space above the troughs and the vertical air passage a is indicated in Fig. 5, in which 51 is the ventilator closure which is hinged at 52 to the lip 53 of the trough 17 and is connected by link 54 to the crank 55, mounted on shaft 56 which is rotated by handle 57 on the front of the machine. It is apparent that this handle may be rotated to open the ventilator 51 to the position indicated by the dotted line, thus establishing a free air passage from the space occupied by the germinating seed in the trough to the vertical air space a; it is also apparent that the handle 57 may be used to completely shut the ventilator as indicated in the drawings.

It will be observed from the structure described and illustrated that it is completely assembled by the clamps 12 on the supporting posts and that the entire structure depends upon these clamps. It can thus be erected, or dismantled, or parts may be replaced, with the greatest facility and the troughs may be nestled within each other and crated for shipping purposes.

Figure 10:
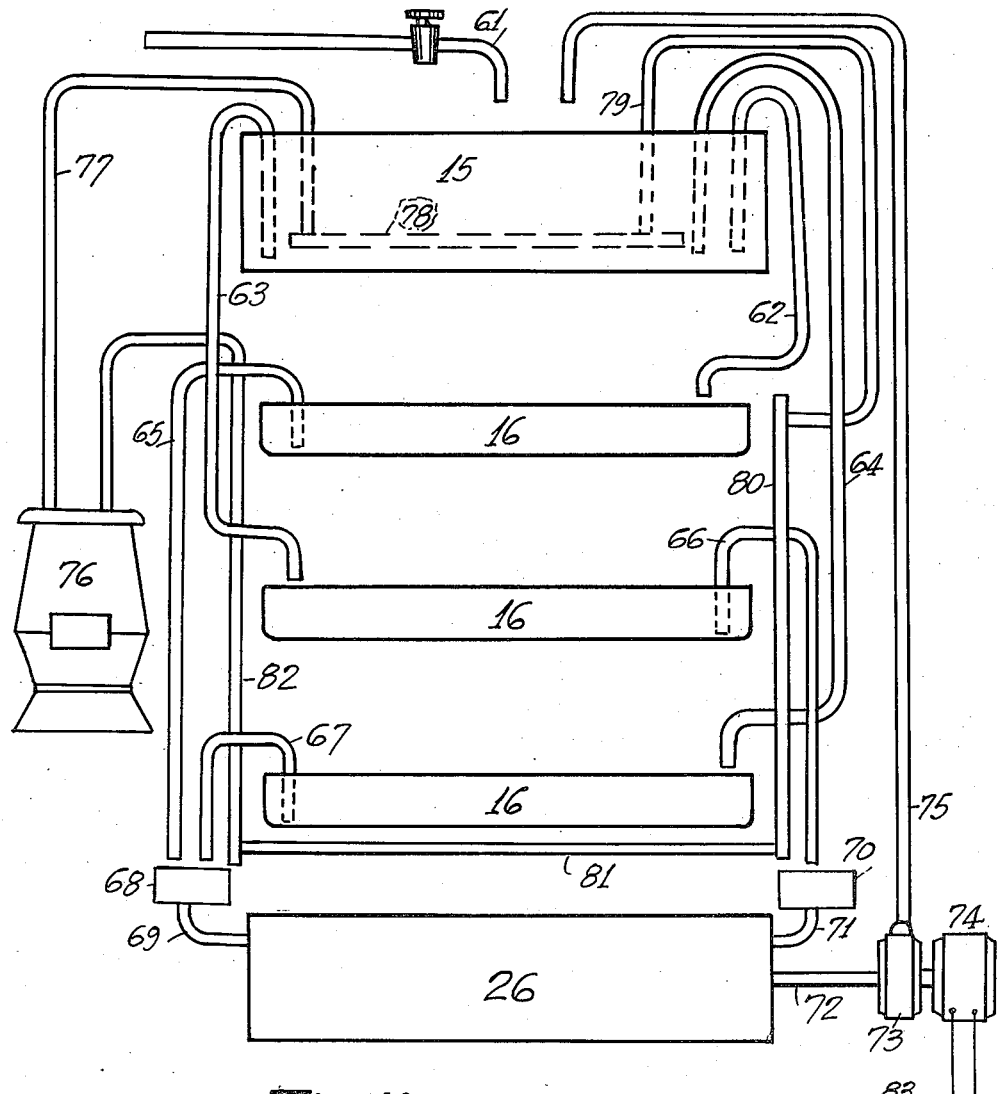
Fig. 10 is a diagram showing one arrangement for transferring liquid fertilizer from a tank to the troughs by a siphon, also transferring the fertilizer from the troughs by another syphon, this diagram also includes the heating coils and an electrically operated pump for filling the tank.

In the diagram in Fig. 10, the tank 15 at the top is supplied with water from the supply pipe 61 and the fertilizer is dissolved in this water. Its temperature is regulated by the pot stove 76 which has a hot water coil connecting by 77 to the heating coil 78 in tank 15 and by 79 to the heating pipes 80, 81 and 82 back to the stove. When the proper temperature is obtained in the solution in tank 15 it is drawn off by pipe 62 to the trough 16, by pipe 63 to the second trough 16 and by pipe 64 to the third trough 16 as may be required. The liquid, after it has been used, is drawn off from the upper trough by pipe 65, from the second trough by pipe 66, and from the third trough by pipe 67, pipes 65 and 67 discharge into the waste receptacle 68 which connects by pipe 69 to the tank 26 and the second trough discharges into the waste receptacle 70 which connects to tank 26 by pipe 71.

In certain stages of the process the fertilizer fluid may be used several times and for this purpose the pump 73 operated by a motor 74 and connecting by pipe 72 with the tank 26 transfers the liquid from this tank through pipe 75 to the top tank to be used again. If the liquid is not to be used again the receptacles 68 and 70 are turned into a waste line.

The diagram in Fig. 10 indicates that the pipes controlling the flow of liquid from a higher to a lower level operate on the principle of a siphon but no means is shown in the drawings for starting the siphon. These pipes may be connected with a pump for this purpose or other means may be used to effect the flow of the liquid as desired; in the larger installations an automatic control may be provided for filling and emptying the troughs and for regulating the temperature which is not a part of the present invention. A system of this kind is described in co-pending application Serial No. 755,841, filed Dec. 3, 1934. The motor 74 is connected by the wires 83 to a suitable source of electric supply.

The heating system is preferably obtained from hot water pipes in which the heated water is circulated. This prevents any abnormal increase of heat at isolated portions of the system and secures a more equal distribution. It will be observed in Fig. 10 that the heating pipe 81, which may be constructed in the form of a manifold, is placed below the bottom trough as it is found in practice that more artificial heat is required at the bottom of the machine than at the top.

The machine described is particularly adapted for the process of the above patents in which the liquid nutrient is applied to the seed without soil and the extent of the seed saturation is easily regulated by regulating the height of the liquid in the troughs. The process is generally referred to as seed cultivation and includes the rapid production within a housing of edible shoots from the seed that is shielded from the sunlight and that is maintained at a temperature to stimulate the germination of the seed.

A ten day cycle of operation is established by loading a different section each day for ten days. At the end of the tenth day, the first section is harvested and the section is reloaded. On the eleventh day, the next section is harvested and reloaded, and so on for each section. After the tenth day, the cycle is established and continues in rotation. If the seed requires a different time period for maturing, the sections must be adjusted to the cycle of operation.

The machine shown in Figs. 10a and 10b includes a frame that is suspended from pivoted rods carrying the trays and whose elevation in the trough can be regulated by swinging the frame on its support, these drawings also show a machine in which a single row of trays are used in troughs that are narrowed for this purpose.

The trough 16, Fig. 10a is mounted to drain from the outlet 131, the end 132 being lower than the other end for this purpose. In order to maintain the trays level corresponding to the liquid level of the trough the frame 125 upon which the trays slide, is supported from the vertical rods 126 which are pivotally connected to the frame 125 and are supported by a pivot at 127. The screw rod 128, with the handle 129 engaging the fixed support 130, swings the frame 125 on the parallel rods 126, which raises the frame as indicated by the dotted lines and, at the same time maintains the trays level.

It is found in practice that the seeds grow comparatively long roots which increase in length as the cultivation matures, in some cases it is preferable not to saturate the seed, but to rely upon the roots in the solution for the plant food. This construction in which the height of the frame is regulated by a screw adjustment enables the space for the roots to be progressively increased while the solution in the trough is conserved.

In Fig. 10b a pair of narrow troughs 16 are placed adjacent, each trough being the width of the trays 17. A partition 133 may be placed between these troughs, if it is desirable to separate them. The machine is supported by vertical channels 134 and is enclosed by the wall board 136, 137 and 138. Lights may be provided at 139, where light is desirable in the process, or electric heating units may be used in the same outlets.

It should be understood that this machine is intended for use on farms where, in some cases, electricity is not available and where, in other cases, running water is not available and the equipment should be constructed in each case to suit the prevailing conditions.

Having thus described my invention, I claim:

1. A machine for seed cultivation comprising a plurality of supporting posts, spaced clamps on said posts, transverse members supported by said clamps, a tank supported on top of said posts and a series of troughs placed one above the other supported on said transverse members, trays containing the seeds placed in said troughs, said trays having perforated bottoms, means for transferring a liquid fertilizer from said tank to each trough and means for removing the liquid from each trough.

2. A machine for seed cultivation comprising a plurality of supporting posts, spaced clamps bolted on said posts having a projecting member secured by the clamp bolt, transverse members supported by said clamps and held in place by said projecting members, troughs removably supported one above the other on said transverse members, trays with open bottoms containing the seeds placed in said troughs and means for transferring a liquid fertilizer to said troughs and means for removing said liquid from said troughs.

3. A machine for seed cultivation comprising a plurality of supporting posts, spaced clamps bolted on said posts having a projecting member secured by the clamp bolt, transverse members supported by said clamps and held in place by said projecting members, troughs removably supported one above the other on said transverse members, trays with open bottoms containing the seeds placed in said troughs, a tank containing a liquid fertilizer, means for heating the liquid in said tank and for heating some of said troughs, means for transferring the liquid from said tank to said troughs and means for removing said liquid from said troughs.

4. A machine for seed cultivation comprising a plurality of supporting posts, spaced clamps bolted on said posts having a projecting member secured by the clamp bolt, transverse members supported by said clamps and held in place by said projecting members, troughs removably supported one above the other on said transverse members, trays with open bottoms containing the seeds placed in said troughs, a tank containing a liquid fertilizer, a hot water heating coil for heating the lower troughs, means for transferring the liquid from said tank to said troughs and means for removing said liquid from said troughs.

5. A machine for seed cultivation comprising a plurality of supporting posts, transverse members supported by said posts, troughs removably supported and spaced one above the other by said transverse members, trays with open bottoms containing the seed placed in said troughs, walls for enclosing said machine supported by said posts and enclosing a vertical air space between said troughs and said walls and a ventilator controlling the passage of air from said troughs to said air space.

6. A machine for seed cultivation comprising a plurality of supporting posts, transverse members supported by said posts, troughs removably supported and spaced one above the other by said transverse members, trays with open bottoms containing the seed placed in said troughs, heat insulated walls enclosing said machine and providing a vertical air space around the machine and an adjustable closure between said vertical air space and the space above each trough.

7. A machine for seed cultivation comprising a tank for a fertilizing liquid, a plurality of troughs spaced one above the other, trays with open bottoms containing the seed placed in said troughs, means for transferring the fertilizing liquid from said tank to said troughs and means for removing said liquid from said troughs, a heat insulating wall enclosing said machine and an independent heating system comprising pipes with a heating medium circulating therein, partly located in said tank and partly associated with the lower troughs.

8. A machine for seed cultivation comprising a plurality of posts, transverse members secured to said posts, troughs removably supported and spaced one above the other by said transverse members, an enclosing wall for said machine made from sheet stock arranged in abutting panels and means for securing said walls in place by a band placed around said posts with its ends passing between the panels and having its free ends turned over to hold said panels in place.

9. A machine for seed cultivation comprising a plurality of posts, transverse members secured to said posts, troughs removably supported and spaced one above the other by said transverse members, an enclosing wall for said machine made from sheet metal in panels having their edges bent outwards and abutting against each other, a heat insulating board placed on said panels within said edges, and means for securing said walls in place by a band placed around said posts with its ends between the abutting panels and turned over to hold the panels and board in place.

10. A machine for seed cultivation comprising a plurality of supporting posts, clamps for said posts, transverse members supported by said clamps, troughs removably supported and spaced one above the other by said transverse members, trays with open bottoms containing the seed placed in said troughs, horizontal members supported by said clamps, wall panels supported by said horizontal members and a band of bendable material connecting said panels to said horizontal members.

11. A machine for seed cultivation comprising a plurality of troughs supported and spaced one above the other, trays with open bottoms containing the seed placed in said troughs in rows, parallel slides for said trays in said trough, said slides being deflected upwardly at the loading end to raise the tray over the edge of the trough and means for supplying a fertilizing liquid to said troughs.

12. A machine for seed cultivation comprising a trough containing a nutrient liquid, a frame in said trough supporting trays with open bottoms carrying the seed and means for elevating and lowering said frame in the liquid.

13. A machine for seed cultivation comprising a trough containing a nutrient liquid, a frame in said trough, parallel, pivoted members supporting said frame, trays with open bottoms containing the seed supported by said frame and means for swinging said frame on said parallel members to regulate the saturation of the seed in said liquid.

14. A machine for seed cultivation comprising a trough containing a nutrient liquid, said trough being mounted on a slope for the purpose of draining said liquid, a frame in said trough, means for supporting said frame in a level position independently of said trough, trays with open bottoms containing the seed supported by said frame and means for adjusting the height of said frame relative to said trough to regulate the saturation of the seed in the liquid.

15. A machine for seed cultivation comprising a trough containing a nutrient liquid, a frame in said trough, means suspending said frame, trays with open bottoms containing the seed to be sprouted supported by said frame and means operated by a screw for swinging said frame to regulate the saturation of the seed in the liquid.

MATTHEW H. LOUGHRIDGE.